(12) United States Patent
Serrano et al.

(10) Patent No.: US 10,382,720 B2
(45) Date of Patent: Aug. 13, 2019

(54) PAIRED VIDEO COMMUNICATION SYSTEM

(71) Applicants: Alejo Serrano, Buenos Aires (AR); Valeria Serrano, Buenos Aires (AR); Norma Adriana Pecorari, Buenos Aires (AR); Sofia Serrano, Buenos Aires (AR); Nicolas Serrano, Buenos Aires (AR)

(72) Inventors: Alejo Serrano, Buenos Aires (AR); Valeria Serrano, Buenos Aires (AR); Norma Adriana Pecorari, Buenos Aires (AR); Sofia Serrano, Buenos Aires (AR); Nicolas Serrano, Buenos Aires (AR)

( * ) Notice: Subject to any disclaimer, the term of this patent is extended or adjusted under 35 U.S.C. 154(b) by 0 days.

(21) Appl. No.: 15/745,671

(22) PCT Filed: Jan. 19, 2016

(86) PCT No.: PCT/IB2016/000572
§ 371 (c)(1),
(2) Date: Jan. 17, 2018

(87) PCT Pub. No.: WO2016/116820
PCT Pub. Date: Jul. 28, 2016

(65) Prior Publication Data
US 2019/0007648 A1 Jan. 3, 2019

Related U.S. Application Data

(60) Provisional application No. 62/106,066, filed on Jan. 21, 2015.

(51) Int. Cl.
*H04N 7/14* (2006.01)
*H04N 21/2187* (2011.01)
(Continued)

(52) U.S. Cl.
CPC .......... *H04N 7/147* (2013.01); *H04L 65/403* (2013.01); *H04N 7/142* (2013.01); *H04N 7/152* (2013.01);
(Continued)

(58) Field of Classification Search
CPC ............. H04N 7/14; H04N 7/15; H04N 7/147
(Continued)

(56) References Cited

U.S. PATENT DOCUMENTS

2010/0228825 A1* 9/2010 Hegde ................. G06F 21/6218
709/204

OTHER PUBLICATIONS

1 Anonymous: "Realpresence Immersive Telepresence Studio Technical Specifications", , May 1, 2014 (May 1, 2014), XP055280246, Retrieved from the Internet: 1 URL:http://www.ivci.com/wp-content/uploads/ 2014/05/realpresence-immersive-studio-technical-specifications.pdf [retrieved on Jun. 14, 2016].*
(Continued)

*Primary Examiner* — Melur Ramakrishnaiah
(74) *Attorney, Agent, or Firm* — Crowell & Moring LLP

(57) ABSTRACT

An intelligent networked system including a plurality of smart nodes, each configured to pair directly with other remote smart nodes over the internet. The system can use a computer process subsystem on a server and connected over the internet to smart node clients located at each of the smart nodes to arrange for automatic sequential pairing amongst different sets of remote smart nodes. Each smart node may include a video display array configured to display a live video communication feed from a paired smart node at approximately full-human body dimensional scale. Each video display may be arranged interlocked with a set of video captured devices that are configured to transmit a live video communication feed to a remote paired video display array at approximately full-human body dimensional scale.

23 Claims, 14 Drawing Sheets

(51) Int. Cl.
| | | |
|---|---|---|
| *H04N 21/414* | (2011.01) | |
| *H04N 21/81* | (2011.01) | |
| *H04L 29/06* | (2006.01) | |
| *H04N 7/15* | (2006.01) | |

(52) U.S. Cl.
CPC ... *H04N 21/2187* (2013.01); *H04N 21/41415* (2013.01); *H04N 21/812* (2013.01); *H04N 7/144* (2013.01)

(58) Field of Classification Search
USPC .......................................... 348/14.01–14.16
See application file for complete search history.

(56) References Cited

OTHER PUBLICATIONS

International Search Report (PCT/ISA/210) issued in PCT Application No. PCT/IB2016/000572 dated Jun. 27, 2016 (Three (3) pages).
International Preliminary Report on Patentability (PCT/IB/373) including Written Opinion (PCT/ISA/237) issued in PCT Application No. PCT/IB2016/000572 dated Jun. 27, 2016 (Nine (9) pages).
"Realpresence Immersive Telepresence Studio Technical Specifications," May 1, 2014, XP055280246 (Eleven (11) pages).
"Videowall Display Solutions Samsung Commercial Displays," Jan. 1, 2013, pp. 1-12, Retrieved from the URL: http://www.samsung.com/us/system/b2b/resource/2014/01/02/Videowall-Display-Solutions.pdf [retrieved on Jun. 14, 2016] XP055280177 (Twelve (12) pages).

\* cited by examiner

PAIRED VIDEO COMMUNICATION SYSTEM

This application claims priority to provisional U.S. application No. 62/106,066, filed on Jan. 21, 2015. The entire disclosure of such application is incorporated by reference.

BACKGROUND OF THE INVENTION

The concept of 'smart' cities relates to the use of digital technologies to enhance a city's performance and overall well-being, to reduce its costs and resource consumption, and to engage it more effectively and actively with its citizens. Advances in telecommunications, combined with electronic and digital systems, have 'compressed' time and space, allowing increasingly rapid rates of global interchange, effectively connecting billions of people worldwide. These exchanges within virtual environments have primarily empowered individuals globally through the use of virtual private networks (VPN), intranets, or even the World Wide Web as a whole.

As an example, today our lives are defined by the interaction between two worlds: the physical and the virtual one. The latter, where the Internet has knitted the World Wide Web as a parallel world built-up from scratch, as gradually every single piece of information and activity that could be undertaken in the physical world, has been inputted in a mirrored-virtual one, making it reachable and available to all those with proper technological access. Through social networking, people have discovered and experienced the openness and accessibility to meet and interact with pairs globally, within the virtual world by enabling instant connection ('compressing' time) regardless of physical location ('compressing' space), thereby trespassing all borders, from cultural, economic, political and/or of the physical geographical type, amongst others. Nonetheless, according to 2014 statistics, more than 60% of the world population still has no access to the Internet; moreover, it is unevenly distributed.

Today, virtual communication schemes have developed in private and semi-private virtual environments, connecting family, friends and companies around the world, through the use of social networks and videoconferencing software platforms. Although the virtual world has extensively expanded and qualitatively evolved along the past 20 years, there is still an undisputable dependency and subordination to its physical equivalent, as virtual technologies are enrooted within physical environments (i.e. undersea internet cable global network) and enabled within physical devices (i.e. a smartphone, tablets). We are physical beings living in physical worlds.

In this regards, digital video-communication schemes (such as video-conference platforms, social networks, etc.) have a common denominator in that the perceptible live video-feeds are constrained to that of the size of the device being used (i.e. laptops, smartphone, tablet, etc.). Typically, such schemes have digitally captured physically realities in 'compressed' dimensions, reduced to 1:0.1, 1:0.2 scales (amongst many other possible combinations), where '1' represents the real dimension scale of the physical world (full human-body dimensional scale) and '0.1', '0.2' represents the virtual reality scale, according to the digital device where the video feed is streamed. Thus, the communication message focuses on the figure of the interlocutors, while there is little or no context (physical background) awareness. These very same devices that enable the connection are the ones that define its limitations.

In any act of communication, verbal and non-verbal signs produce meaning, which lead to the creation of social relationships, systems of knowledge and thus cultural identity. Humans are able to communicate verbally and non-verbally. We use language in verbal communication and signs, symbols, sound or paralinguistic means to communicate a message. Humans respond to cultural identities, and the process of communication takes place intrinsically within this cultural orientation. Conceptually, central to any communication process appears the message that is encoded within a certain context; and it is sometimes the same context the one that influences and characterizes the decoding of the message, extending it beyond linguistic signs and gestures. With this regards and as mentioned, when performing any type of virtual communications, today live video feeds are scaled to the dimensions of the device used, whether a laptop, TV-display, tablet or cell phone, for instance. Thus, there is little or no perceptible indication of the surrounding context and/or location, and no indication as to, for instance, the city or even the country interlocutors are speaking to and from, which further generates a clear disconnection from the physical context and background, while discharging the presence of social and cultural indicators in the shaping of a message.

SUMMARY OF THE INVENTION

An intelligent networked system that may be used for global public communication and service is disclosed. The intelligent networked system is comprised of a subsystem of smart nodes, where each subsystem is programmed to work in pairs with a counterpart subsystem, to enable a communication channel between them. The system deploys simultaneous exclusive paired communication channels, according to the set number of paired-smart nodes existing within the network. Each subsystem of smart nodes is capable of enabling public video-streaming communication and service for multiple users, while comprising various levels of engagement amongst registered and non-registered users.

Each smart node embodiment is physically located in an exclusive geographical location, materializing a physical social-network of digital meeting points enrooted within the physical world. The placement locations may vary from either being set, both indoors and outdoors, within the public realm, private realms with open public access, or even closed private networks located within private compounds.

The present invention may take the form of an intelligent street furniture system of networking smart nodes or digital portals. In the preferred embodiment, such a system is configured to provide a public communication and marketing platform, for public use and service. As in the past public telephone booths enabled peer-to-peer public telecommunication within the public realm, the present invention may provide group and peer-to-peer live video communication, a Wi-Fi access point, as well as general public service information, when located in the public space, and may implemented be a part of smart cities strategies and design.

The present invention may provide an interactive global communication networked system, which is capable of enabling a public high-definition (HD) video-streaming communication platform, for multiple (simultaneous) users. The interactive public communication platform may offer multiple user-engagement stages, to both registered and non-registered users, ranging from a basic public interactive gestural-performing communication experience (live-video feeds with no streaming-sound enabled) to the extent of enabling, amongst registered users, unlimited private interactive video-conference communications sessions within the public realm or set context location to the corresponding smart node, by pairing the intelligent networked system to the users' personal mobile/wearable digital technologies.

Each smart node embodiment may include both a hardware and computer process subsystem. The hardware subsystem may comprise both an external embodiment that may contain a digital display assembly comprised of multiple display panels with an interlocked rapport of embedded digital video-capture devices working in association with each other and connected to said computer process subsystem along with a composite chassis that may serve as an external backside cover fixed to its supporting structure anchored to a set of upright supports that are bolted to a basal surface; and an internal embodiment that may contain a Wi-Fi modem and a personal computer (i.e., a CPU) wired to a symmetric dedicated Internet connection. The computer process subsystem may provide for machine-to-machine (M2M) technology through the Internet, enabling and configuring the pairing and coupling of at least one of said smart nodes to a corresponding remote smart node within said subsystem network of smart nodes, executing a sequential bilateral communication channel through the cross-transmission, capturing and reception of live video feeds between said pair of coupled smart nodes, replicated along the plurality of smart nodes within the intelligent networked system, according to preset variables. In a preferred embodiment, the video streaming performance is in real-time and full scale (full human body dimensional scale, e.g. 1:1), which can allow circumstantial users to communicate with counterparts, physically located at the temporally paired-smart node, interacting in a public and collective way or, if desired, on a more private manner within a public environment.

An embodiment of the present invention may provide a computer process subsystem, which engages and masters the performance of the intelligent networked system through an administration console, which is capable of utilizing technological processes engaged within the interactive communication networked system to configure, run and coordinate the live-video communication media broadcasting and marketing platform. Such a solution may include: a) the HD live video-streaming feed, b) an advertising platform to facilitate global advertisement campaigns as well as more personalized ones, based on user-defined preferences and profile, c) registered-users to engage privately on a public network, using their mobile device embodiments, d) a public digital display live information taskbar showing real-time information and news, for public use and service, e) enabling and managing the public Wi-Fi access point, and f) enabling and managing the mobile application software embodiment.

The present invention may also comprise a mobile application to provide a more personalized service, to accomplish further stages of engagement within the intelligent network system of smart node embodiments, to enable private communication and/or interaction between users, either in the form of a call, a messaging or chat session. The registered users of the system may form a digital social network within the global open network of social exchange.

The present invention may also provide an intelligent network system that facilitates a multi-dimensional advertising and marketing scheme.

Figure 1A:
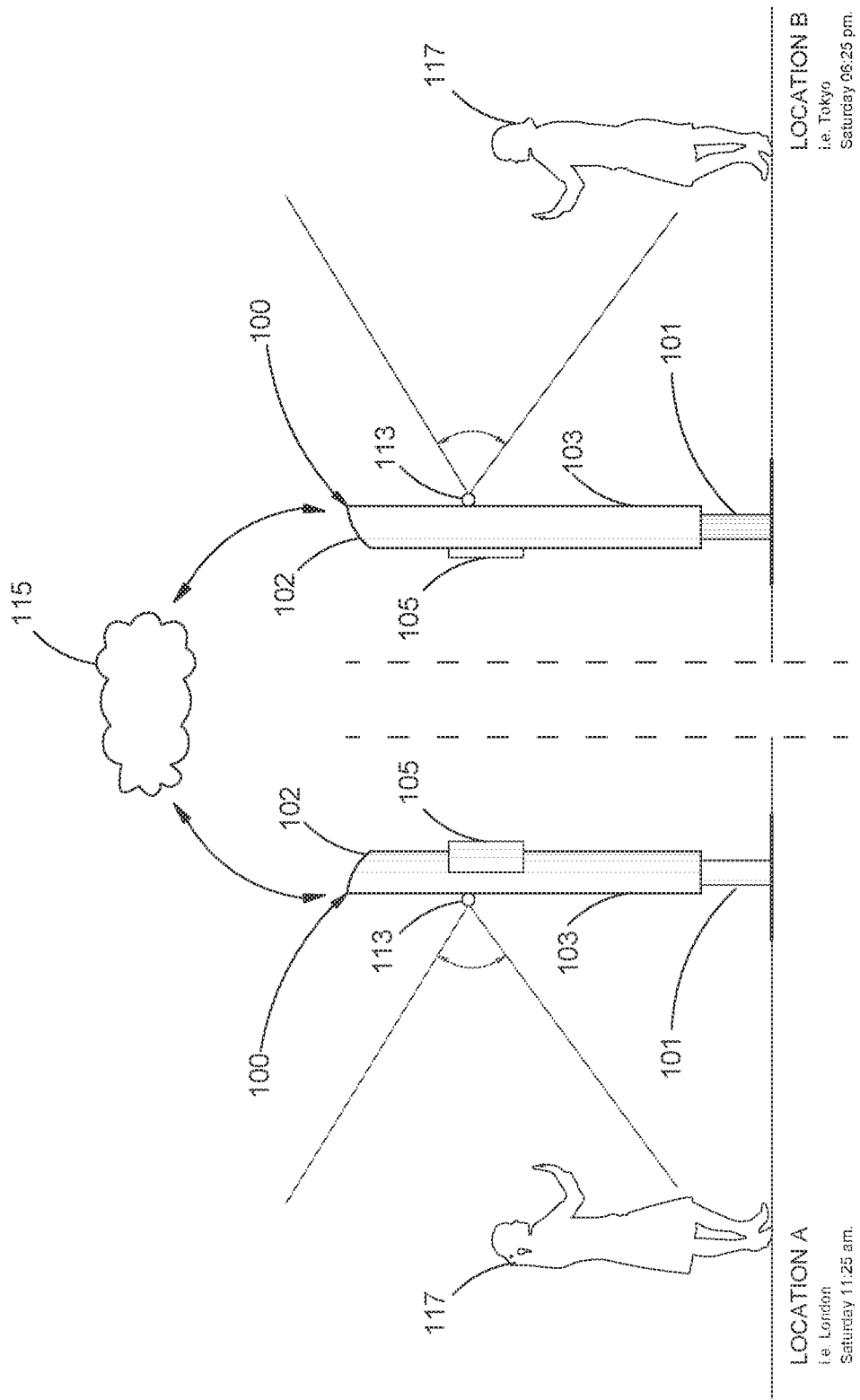
FIG. 1A illustrates an exemplary environment of two paired-smart nodes, schematically set on two different locations A and B within an embodiment of an intelligent network system configured in accordance with the principles of the invention, enabling the public audience or non-registered users to interact facing each other in real-time and in full dimension.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION OF THE DRAWINGS

As discussed above, the present invention may be implemented in numerous forms and embodiments. The following detailed description is provided to assist the reader in gaining a comprehensive understanding of the methods, apparatuses, and/or systems described herein. Accordingly, various changes, modifications, and equivalents of the methods, apparatuses, and/or systems will be understood to those of ordinary skill in the art. Also, descriptions of well-known functions, processes, and features may be omitted for increased clarity and conciseness.

Common to each embodiment is an intelligent networked system 121 (see FIG. 7), comprised of a subsystem network of digital portals or smart nodes 100.

Figure 1B:
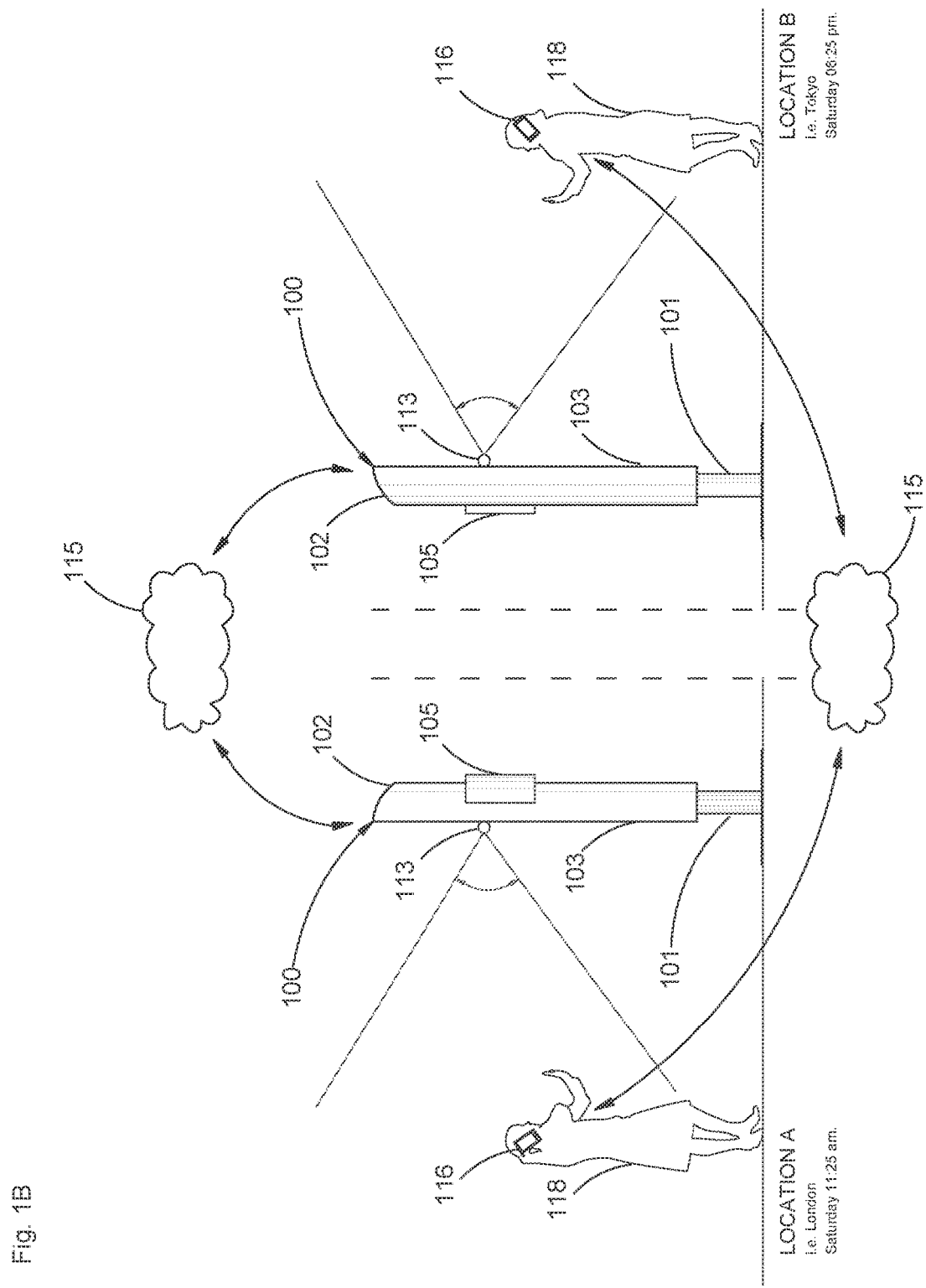
FIG. 1B illustrates an exemplary environment of two paired-smart nodes, schematically set on two different locations A and B within an embodiment of an intelligent network system configured in accordance with the principles of the invention, enabling registered users to interact facing each other in real time and in full dimension.

FIG. 1A illustrates a configuration in accordance with one possible embodiment wherein any audience, in the form of non-registered users 117 or registered users 118 (as shown in FIG. 1B) is able to engage and interact with the intelligent networked system 121 by facing the front-view of a smart node 100, wherein each smart node 100 is geographically situated in different locations 'A' and 'B', comprising together a paired-smart node 100 'A-B'. The paired smart node 100 'A-B' may be technologically enabled through IT infrastructure, cloud services 115 and a tailored computer software subsystem platform, such as the examples described in FIGS. 9, 10 and 11, to enable an exclusive live HD video-streaming communication channel between smart node 100 'A' and smart node 100 'B', allowing indistinctly registered users 118 and non-registered users 117, whom are standing facing each smart node 100, to see each other and interact in real-time and in full human-body scale (e.g., 1:1).

Each digital smart node 100 may include a digital display assembly comprised by multiple display panels 103 (the combination of multiple individual panels making up a video display array), with an interlocked rapport of embedded digital video-capture devices 113, working in association with each other and connected via cloud services 115 to the computer process subsystem embodiment, to form the smart display and video-capturing platform. The mentioned digital display assembly, embodied in the digital smart node 100 'A', comprised by the mentioned display panels 103, broadcasts live video-streams captured by the set of interlocked digital video-capture devices 113 of a paired smart node 100 'B'. Likewise, the display panels 103 embodied in smart node 100 'B' broadcasts live video-streams captured by the set of interlocked video-capture devices 113 of the paired smart node 100 'A'.

The embodiment of the set of digital video-capture devices 113 may comprise those of varied types, including those of kinetic form amongst others, to create dynamic experiences and interactive digital advertising platforms. In one embodiment, the smart nodes 100 will also allow users to interact with them through the use of augmented reality (AR) applications that may work together with the video-capture devices 113, making them interactive participants in the video feed broadcasted on the display 103. As complimentary information, augmented reality (AR) is a live direct or indirect view of a physical, real-world environment whose elements are augmented (or supplemented) by computer-generated sensory input such as sound, video, graphics or GPS data. Advanced AR technology (e.g. adding computer vision and object recognition) the information about the surrounding real world of the user becomes interactive and digitally manipulable, making artificial information about the environment and its objects to be overlaid on the real world. A major difference between Augmented Reality and straight forward image recognition is that you can overlay multiple media at the same time in the view screen, such as social media share buttons, in-page video even audio and 3D objects. Augmented reality has many applications, as an example, applying AR technologies in retail or commerce, may enhance user experience by enabling product previews, allowing customers to view what's inside a product's packaging without opening it.

The smart node 100 'A' may typically display the live video feed captured by a remote smart node 100 'B'. However, it may alternatively display (e.g., at defined or sporadic time intervals) the same video feed captured by the node's own video-capture devices 113, which would cause smart node 100 'A' to function as a full size mirror which, through the aid of augmented reality applications for instance, creates further levels of engagement for the user to interact with smart nodes 100. Likewise, in certain applications, computer animated characters, items, props, amongst many, may appear on the digital display 103 in order to enable non-registered users 117 interact with them, creating a real-time, full human-body dimensional scale (e.g. 1:1) experience which would either provide a service or an entertainment experience. An embodiment of this type of application may also be used for advertising purposes.

Shown in FIG. 1B, is an embodiment in which each smart node 100 has been conceived and designed as a multiple-user platform, which is configured to simultaneously engage a plurality of registered users 118 and/or non-registered users 117 indistinctively, to interact within the system. To further the interconnectivity experience, and take it to a new and more personalized level, the non-registered user 117 is provided the option to engage further by downloading the embodiment of a mobile software application to the non-registered user's 117 mobile device 116, such as described with respect to FIG. 9. The now digitally registered users 118 of the intelligent networked system 121 may configure a social network within the global open network of social exchange. Each smart node 100 within the intelligent networked system 121 can be embedded with wireless connectivity technology to simultaneously act as a wireless internet access point, a Wi-Fi hotspot, in order to provide free Internet access as a public service by allowing the engagement of any compatible mobile device 116 technology, such as in the form of wearables, portable, mobiles or otherwise. Unlike FIG. 1A, FIG. 1B further shows that a new level of engagement may be accomplished upon registration to the intelligent networked system 121 in which two registered users 118 may achieve a new level of interaction, enabling even a more private and personalized communication between remote fellow registered user 118, either in the form of a Wi-Fi call, a messaging or chat session.

Figure 2:
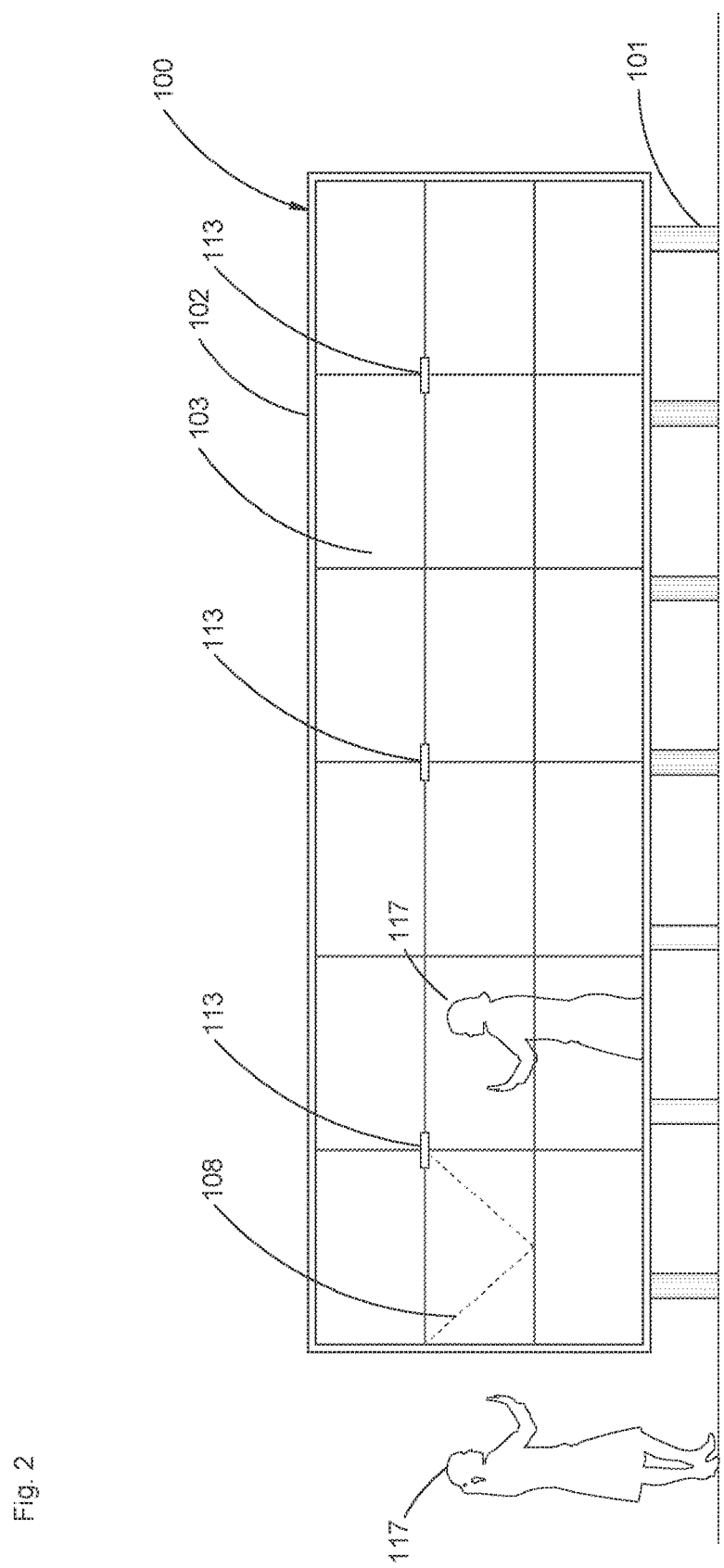
FIG. 2 is a front view of a preferred embodiment of a single smart node, configured in accordance with the principles of the invention.
Figure 4:
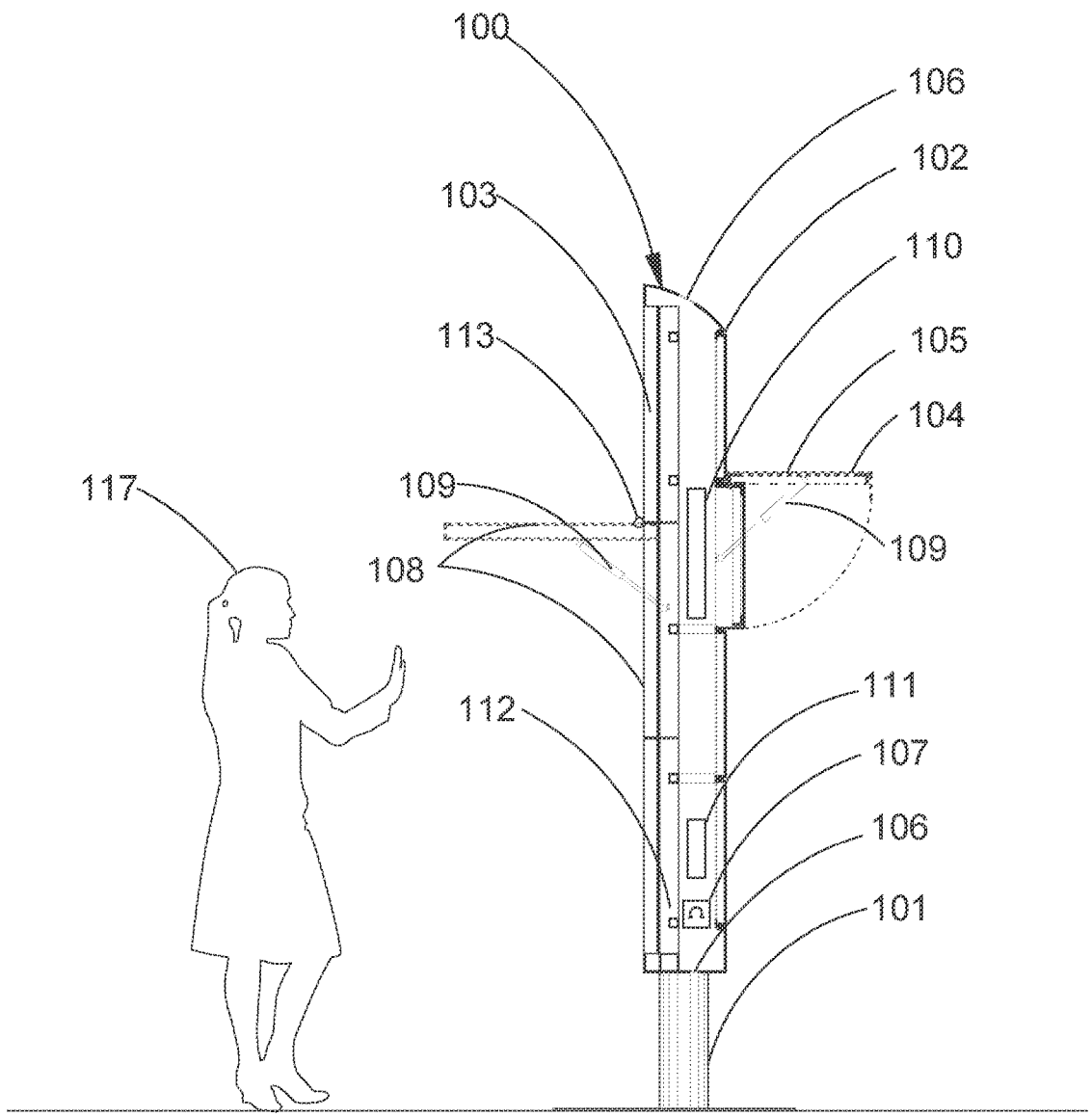
FIG. 4 is a side cross section of a preferred embodiment of a single smart node, configured in accordance with the principles of the invention.
Figure 5:
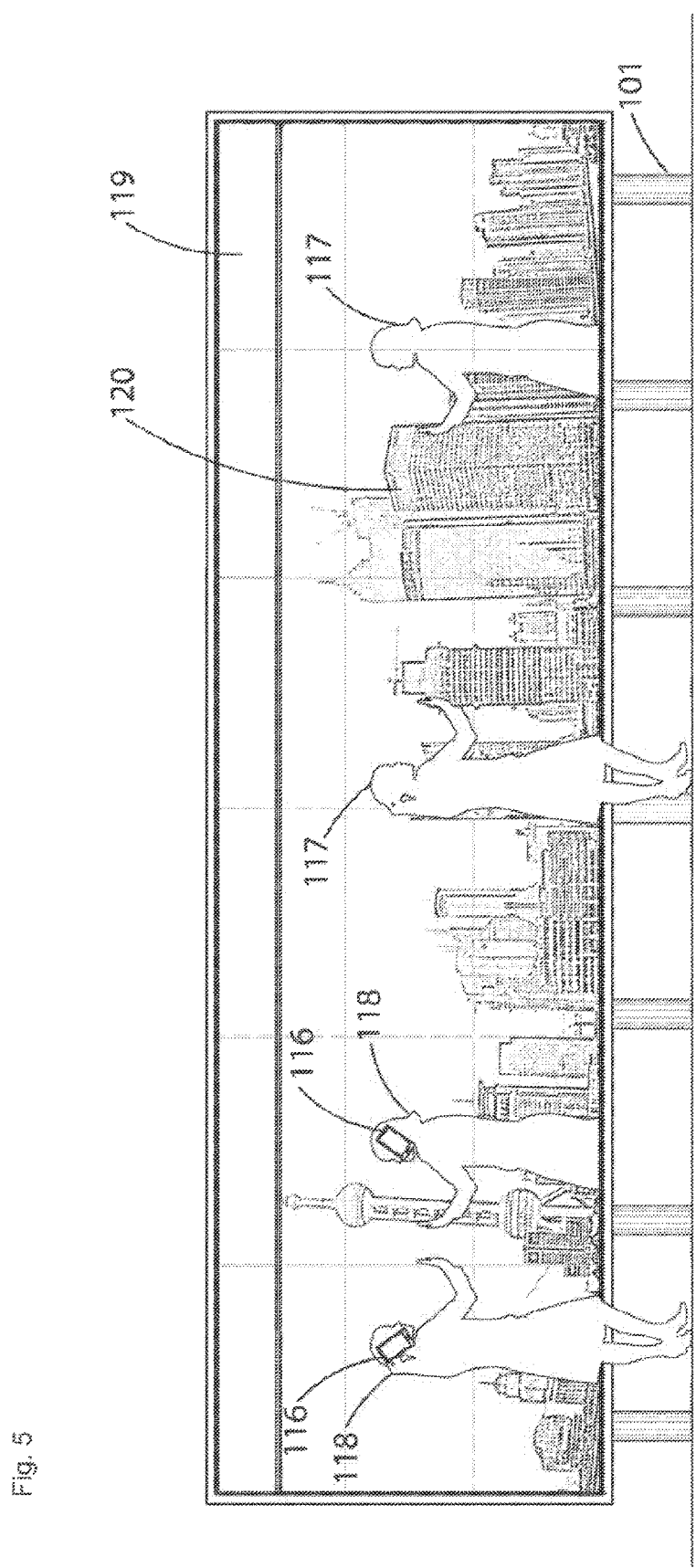
FIG. 5 is a front view of an exemplary embodiment of a digital smart node to visually illustrate how the computer process subsystem can structure the smart node's digital display configuration, by defining two main functional divisions (upper/lower), providing information and communication services to both registered and non-registered users, according to the content to be displayed and broadcasted configured in accordance with the principles of the invention.

FIG. 2 shows a front view of an embodiment of a smart node 100, comprising as part of its hardware components, a hard casing 102 framing a digital display assembly comprised by at least interlocked display panels 103 (the combination of multiple individual panels making up a video display array) with a rapport of embedded digital video-capture devices 113 that capture live video streams of the surrounding environment, incorporating interacting non-registered users 117 and registered users 118, along with all physical context and background, as seen on FIG. 5. All interacting non-registered users 117 and registered users 118 of the mentioned local smart node 100 may communicate and interact with remote fellow non-registered users 117 and/or registered users 118 located at the paired remote smart node, which live video feed is being projected in real-time within the display area 120, as shown in FIG. 5. As further detailed in FIG. 4, the video feed may then be sent to a personal computer 110 embodied within the smart node 100 to re-transmit it via Internet to the corresponding paired remote smart node 100.

Figure 3:
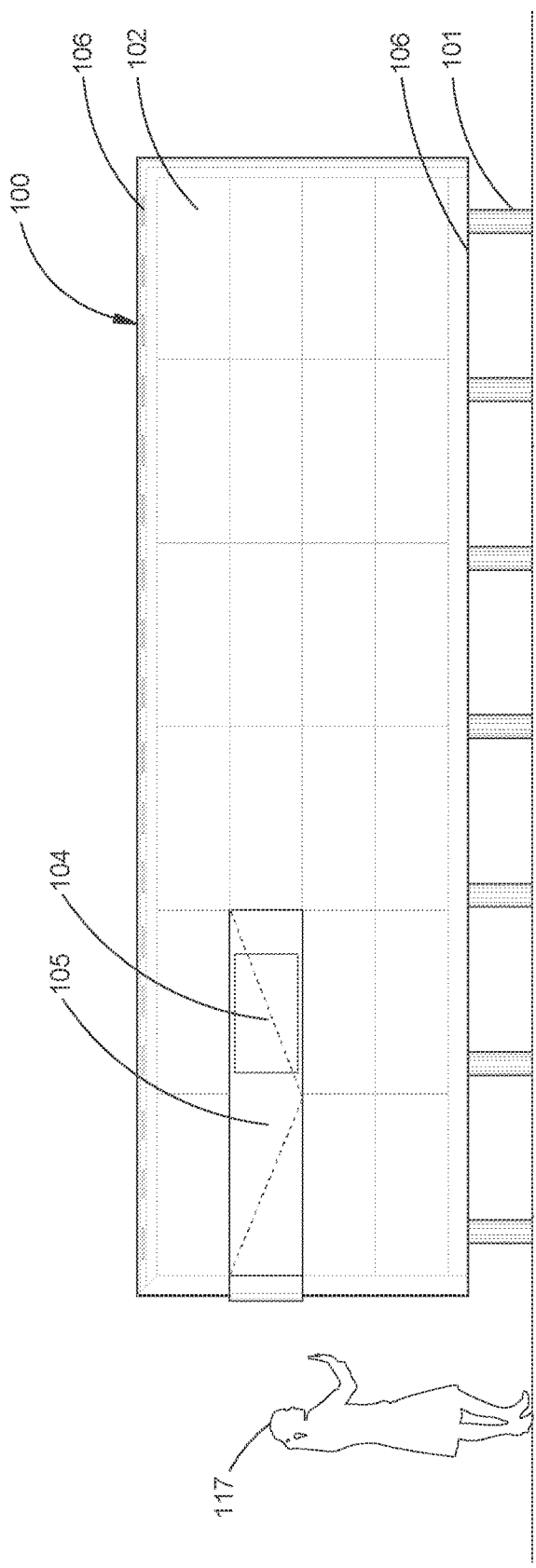
FIG. 3 is a rear view of a preferred embodiment of a single smart node, configured in accordance with the principles of the invention.

FIG. 3 illustrates an embodiment of a smart node 100 from a rear view, showing the hard casing 102, fixed to its supporting structure 112 (identified in FIG. 4), which is anchored to a set of upright supports 101 that are bolted to a basal surface. As a subset to the hard casing 102, an HD display 104 may be engraved with real-time referential information of the counterpart paired smart node 100, such as name and geo-location references, amongst others. As a second subset to the hard casing 102, a basculant door 105 may give access to the inner technological components of the smart node 100, as referred in FIG. 4.

FIG. 4 illustrates a cross section in accordance to one embodiment of a smart node 100, its supporting structure 112 as well as its hardware components. Regarding the support structure 112, the display panels 103 may be attached to a basculant structure 108 to facilitate detachment in case any reparation or else, is needed. This enables them to be connected, replaced or worked upon, directly from the front view of a smart node 100, making it accessible. The basculant structure 108 is secured to a supporting structure 112, which is fixed to a set of upright supports 101 that are bolted to a basal surface. Within the interspace comprised between the display panels 103 and the hard casing 102 are the group of electronic hardware components each smart node 100 needs to become connected. Amongst these, a personal computer 110 may perform as a Client to the virtual server by receiving and sending information to the corresponding temporarily paired smart node 100, situated at a remote location and which corresponds to another subsystem unit to the intelligent networked system 121.

The personal computers 110 within each smart node 100 is provided with the correspondent video graphic card units and memory modules to be able to process the graphic-data which is downloaded from the virtual server. The intelligent system network 121 may work with a computer process subsystem platform (software) specifically designed to foster the networked smart nodes 100, where each smart node 100 subsystem is enabled to communicate with all and every single remote smart node 100 existent within the mentioned intelligent networked system 121. Other components to the hardware infrastructure of the intelligent system 121 may include an embodiment of a Wi-Fi modem 111 which receives Internet through a dedicated symmetric connection 114, provided by a local ISP (Internet Service Provider) according to each smart node 100 location enabling Internet within each smart node 100 by connecting the Wi-Fi modem via an Ethernet cable to the personal computer 110. This same Wi-Fi modem 111 may be the hardware that enables the wireless access point to provide wireless connectivity to all registered users 118 personal mobile devices 116, ranging from mobile technologies to wearables, for instance. Each display panel 103 comprising both areas 119, 120 may be wired to the personal computer 110 that manages them via HDMI cabling and may be connected to an electricity outlet 107, such as via a thermal magnetic breaker and RCD (Residual Current Device) protections. The smart node 100 may take power from the electric grid servicing in its physical location, and powered by either compatibility 110V/220V depending on the local settings of the geo-location of the smart node 100.

In accordance with one possible embodiment, the example depicted in FIG. 5 shows a front view of the smart node 100 where the computer process subsystem software is designed to enable and manage the performance of the smart nodes 100 within the intelligent network system 121 has been set to broadcast, on the digital display panels 103 of the digital display assembly, an operational layout of a possible two differentiated functional areas or active windows. The upper section 119 may be a task-bar, providing live public information and marketing services, where information to be displayed may involve for instance: the location of the set smart node 100, as well as the remote location of the temporarily paired-smart node 100, live weather forecast and live breaking news of both smart node 100 locations, news and sports, social networks indications and postings, amongst other similar information. As an exemplary scheme, the live task-bar area 119 performing as a smart-live information public service and marketing billboard area, may comprise a plurality of active windows, enabling cross-information displayed and shared in real-time between said paired smart nodes 100. Moreover, the embodiment of FIG. 5 can be set as an open platform to address a dynamic approach to public service strategies, such as informing or reporting on missing children, special events within local communities, or even on a global level. The inferior screen division 120 is the area or active window where the live video-streaming feed is broadcasted, in full human-body dimensional scale, corresponding to the live video-caption data, registered within the remote location of the temporarily paired smart node 100.

With regards to the placement location of a preferred embodiment of the subsystem network of smart nodes 100, each smart node 100 may be located in the public realm, and thus, manifesting as an intelligent street furniture infrastructure, for public use and service. Nonetheless, the intelligent networked system 121 may incorporate, if desired, smart node 100 presence in locations within private realms with open public access or even closed environments of private condition, in accordance with the system's design, and if desired, it may enclose private networks located within private compounds, comprising in all cases both indoors and outdoors conditions.

Figure 6:
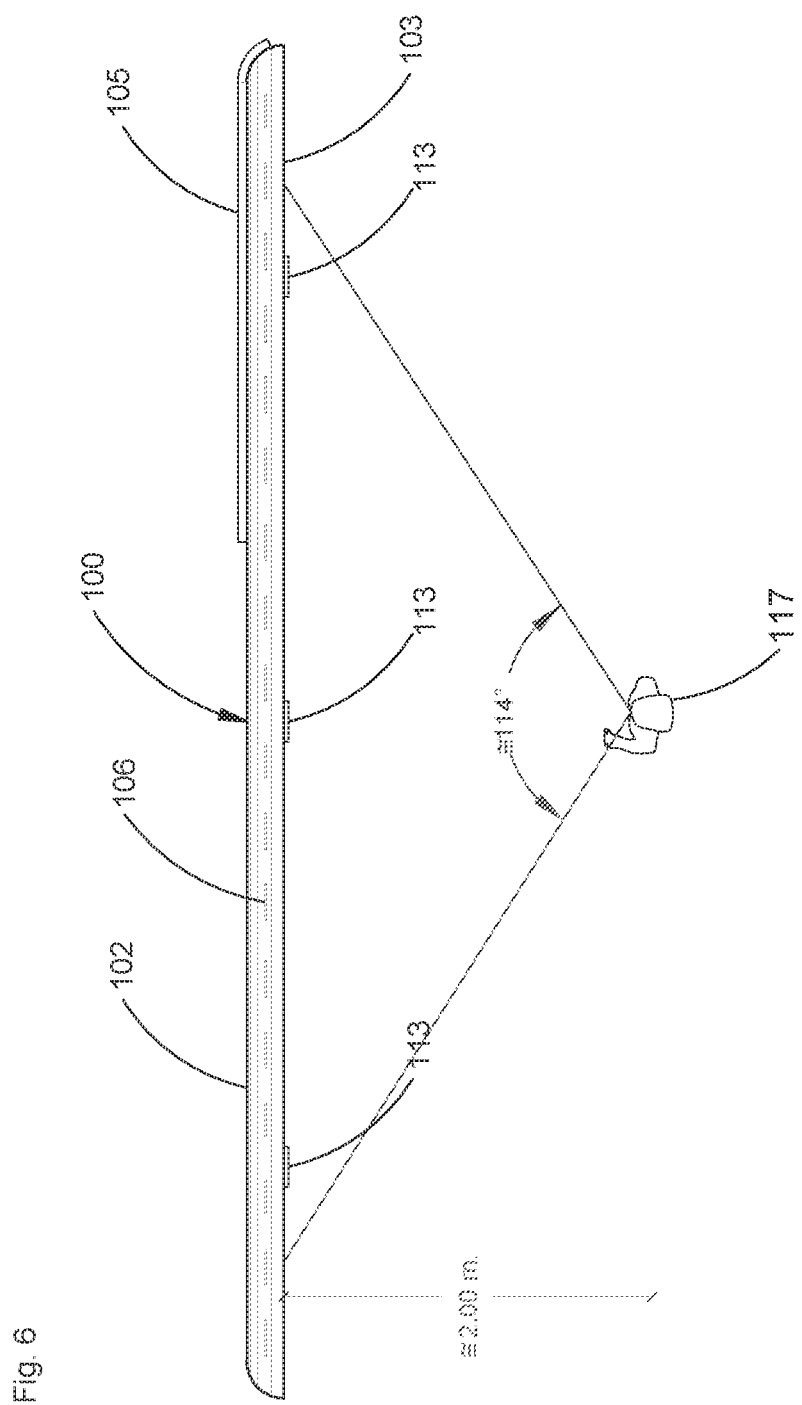
FIG. 6 is an aerial view of a preferred embodiment of a digital smart node configured in accordance with the principles of the invention, illustrating the normal field of view of a user standing facing an embodiment of smart node of the present invention.

As further seen in FIG. 6, a top view of a smart node 100 is shown, where a non-registered user 117 and/or registered user 118 stands facing it, at a proper distance, to enable the set of embedded video-capture devices 113 to capture and, in association with the computer process subsystem, send the video-streaming registration of user and context live, in real-time and proportionate full-human body dimensional scale (e.g., 1:1) to the corresponding paired-remote smart node 100, to be broadcasted live within the display area 120 on the digital display panels 103. Thus, the dimensional scale of the smart node 100 responds to the functional performance needed to deploy within the communication platform involving not only the proportionate public scale in terms of the dimensional scale, but also, in terms of enabling the sharing of 'physical background and context' within the message that is being sent between non-registered users 117 of the system. By context, it is meant that each smart node 100 location will perform as a digital portal, an 'open-window' to a remote foreign community, city, open space, or otherwise. The intelligent network system 121 disclosed herein, may digitally materialize multiple live 'open-windows' to share knowledge and the social contagion of everyday lives at very distant locations and across diverse communities.

As shown in FIG. 6, the normal field of view of a person is approximately 114°, which has been taken into consideration in determining the physical dimensions of the smart node 100 given that the present disclosure can make the user feel ergonomically immersed within the digitally projected context reality of the paired-remote smart node 100 location. Thus, facing the smart node 100 at a proportionate distance, allows any non-registered and registered user 117, 118 to experience an immersive sensation of being physically transported to the paired-remote location, given the dimensions of the performing displays having a glimpse at other locations and cities around the world, which they might have never seen before.

Figure 7:
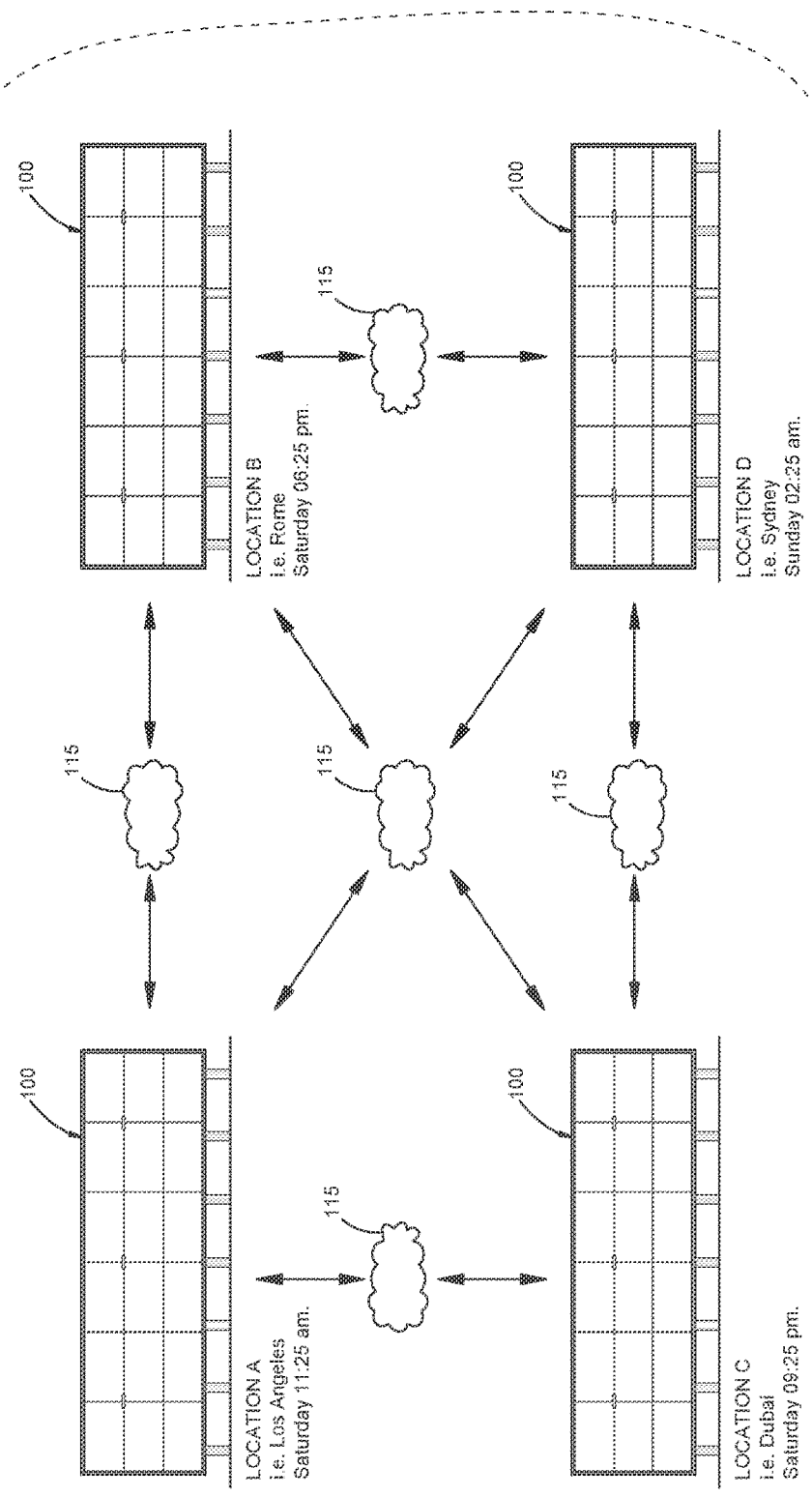
FIG. 7 is an exemplary schematic diagram of a temporal connection-sequence progression illustrating the coupling, decoupling and pairing between remote smart nodes of the intelligent networked system, in accordance with the principles of the invention.

FIG. 7 shows an embodiment of smart nodes 100 in which each is set to a unique geo-physical location, with different locations being set up to connect and interact between each other over an intelligent networked system 121 of smart nodes 100. Each smart node 100 works in pairs with a counterpart, a mirror smart node 100, based on a remote location, as interlocutors in a peer-to-peer communication, establishing an exclusive communication channel between them. The layout depicts a conceptual diagram to show the multiple possible combinations to be accomplished between different smart nodes 100 within the intelligent networked system 121 of smart nodes 100 to guarantee the interconnectivity of all. Thus, in this embodiment, addressing an exemplary intelligent system 121 comprised by a population of four smart nodes 100, define six possible combinations with regards to communication engagement experiences, each deploying an exclusive communication channel through the cross-transmission, capturing and reception of live video-feeds between each set of temporarily paired remote-smart nodes 100.

To consider an example of a paired-communication between a set embodiment of smart nodes 100, whereas a set smart node 100 'A' may be located in the city of Los Angeles and a circumstantially paired smart node 100 'B' in the city of Rome, whereas in a parallel session, a set smart node 100 'C' maybe located in the city of Dubai and circumstantially paired to a smart node 100 'D' located in the city of Sydney. The total number of parallel live-streaming sessions running within each enabled communication channel between paired remote-smart nodes 100 of the global intelligent network system 121 is in direct correlation to the number of smart nodes 100 within it, as well as in accordance and referenced to their corresponding time-zones, determining levels of exposition to enable the coupling. Thus, the very act of physically placing a smart node 100 within a set geographical location, while enabling a connection to a counterpart set of temporarily shifting paired smart nodes 100, defines the dynamics of the intelligent networked system 121, while furnishing cities or special environments, with public service digital platforms.

Figure 8:
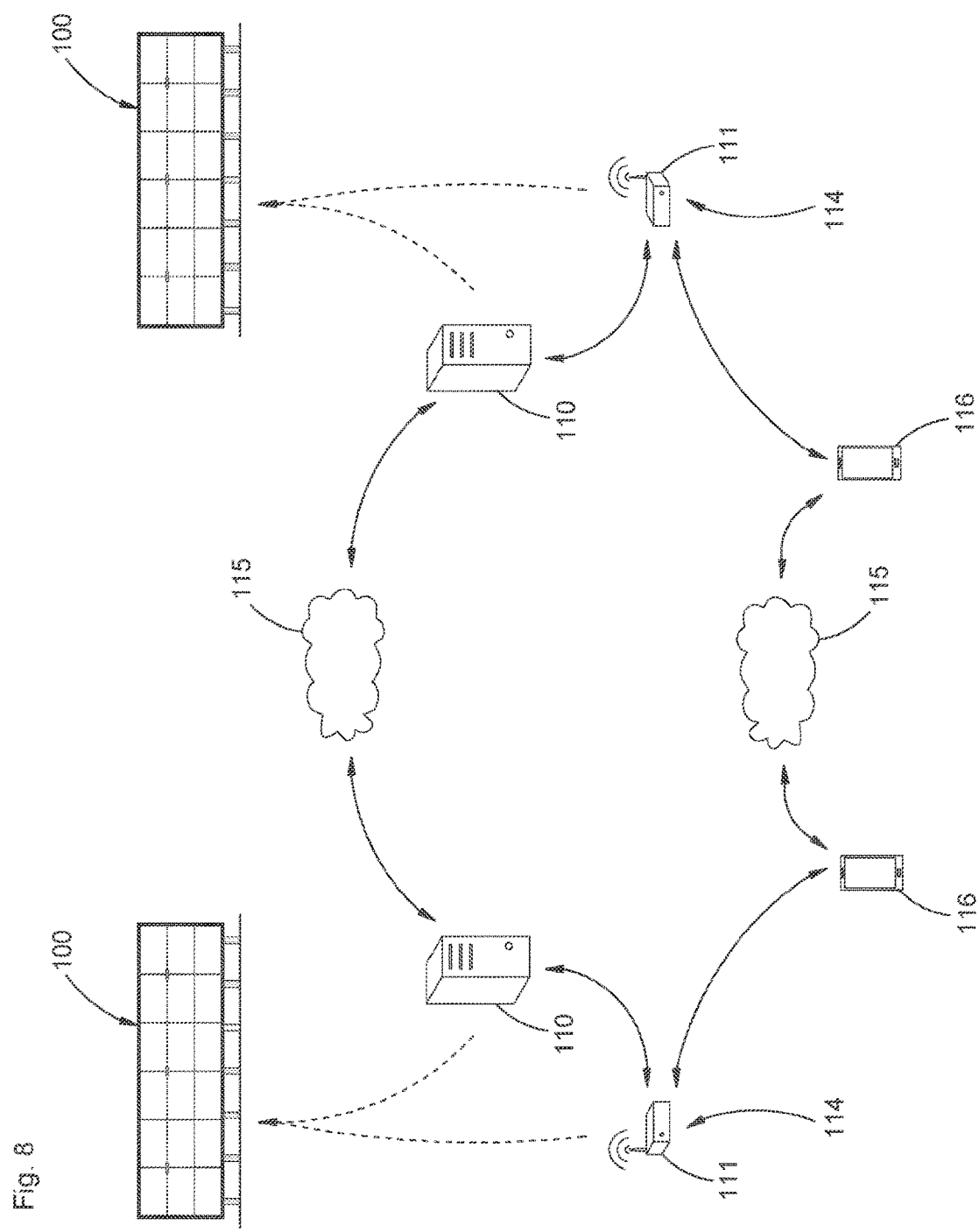
FIG. 8 is an exemplary schematic diagram providing a visual indication of how the internal components of a smart node allows the coupling, decoupling and pairing of remote smart nodes, as well as external mobile device embodiments to be logged into the intelligent networked system, to enable the public service and communication platform, in accordance with the principles of the invention.

FIG. 8 is an exemplary schematic diagram providing a visual indication of how the internal hardware components of a smart node 100 can allow paired smart nodes 100, as well as external mobile device embodiments 116, to be logged into the intelligent system 121, to enable the public communication platform, in accordance with the principles of the invention. The paired-connection of each smart node 100 within the intelligent system network 121 is also channeled through the hardware components of the system. Inside each smart node 100 there are two main components that allow the connection between both paired smart nodes 100 and between registered users 118, which are: a personal computer 110 and a Wi-Fi modem 111 with an Internet connection 114 provided by an ISP (Internet Service Provider). The personal computer 110 runs the computer process subsystem which allows each smart node 100 to be assigned a unique IP address, to be configured as a client within the intelligent networked system 121, to deploy the interconnectivity and communication between each other. The smart node client communicates to the computer process subsystem allocated in the cloud (in the internet 115) on a virtual server, which receives and sends data (live information, live video feed, images, etc.) from and to each smart node client controlling the connection between smart nodes 100. An embodiment of the architecture of the computer process subsystem may be designed to engage and master the performance of the intelligent networked system 121, to configure, run and coordinate the live video-communication and marketing platform by the completion of several tasks, amongst which, defining the pairing, coupling, de-coupling and disconnection of the smart nodes 100 according to a dynamic pre-defined schedule. That computer process subsystem may describe a global 24$h$-loop schedule, to make each and every operable smart node 100 located around the world, to interact with their remote pairs, either located at distant places or within the same region, in a way that over some minimum unit of time, each smart node 100 can be automatically shifting intelligent connections with multiple global counterparts. As an example, if a citizen on a daily commute to work walks through a transportation hub or a public space where a smart node 100 is located, and possibly more than once a day, it is conceivable that in each of those instances the local smart node 100 may be paired with a different remote smart node 100 at different locations. Registered users 118 may connect with their mobile devices 116 through a mobile application software in association with the computer process subsystem, downloadable from the Internet 115 by gaining access to the Wi-Fi access point connection on the smart node 100 if they do not have an Internet connection. Through this mobile application, registered users 118 are logged-in to the intelligent networked system 121, and may interact between each other in a plurality of forms, combined with any format enabled within the their mobile devices 116, for instance, as Short-Message (SMS), Enhance SMS (EMS, Multi-Media Message (MMS), plain email, chat or and even featured Wi-Fi calling and video-calling, which allows registered users 118 to talk between each other through the Internet 115 and with the smart node 100, wherein mobile devices 116 may turn into a complementary devices to interact with the digital display panels 103 of the smart nodes 100

Figure 9:
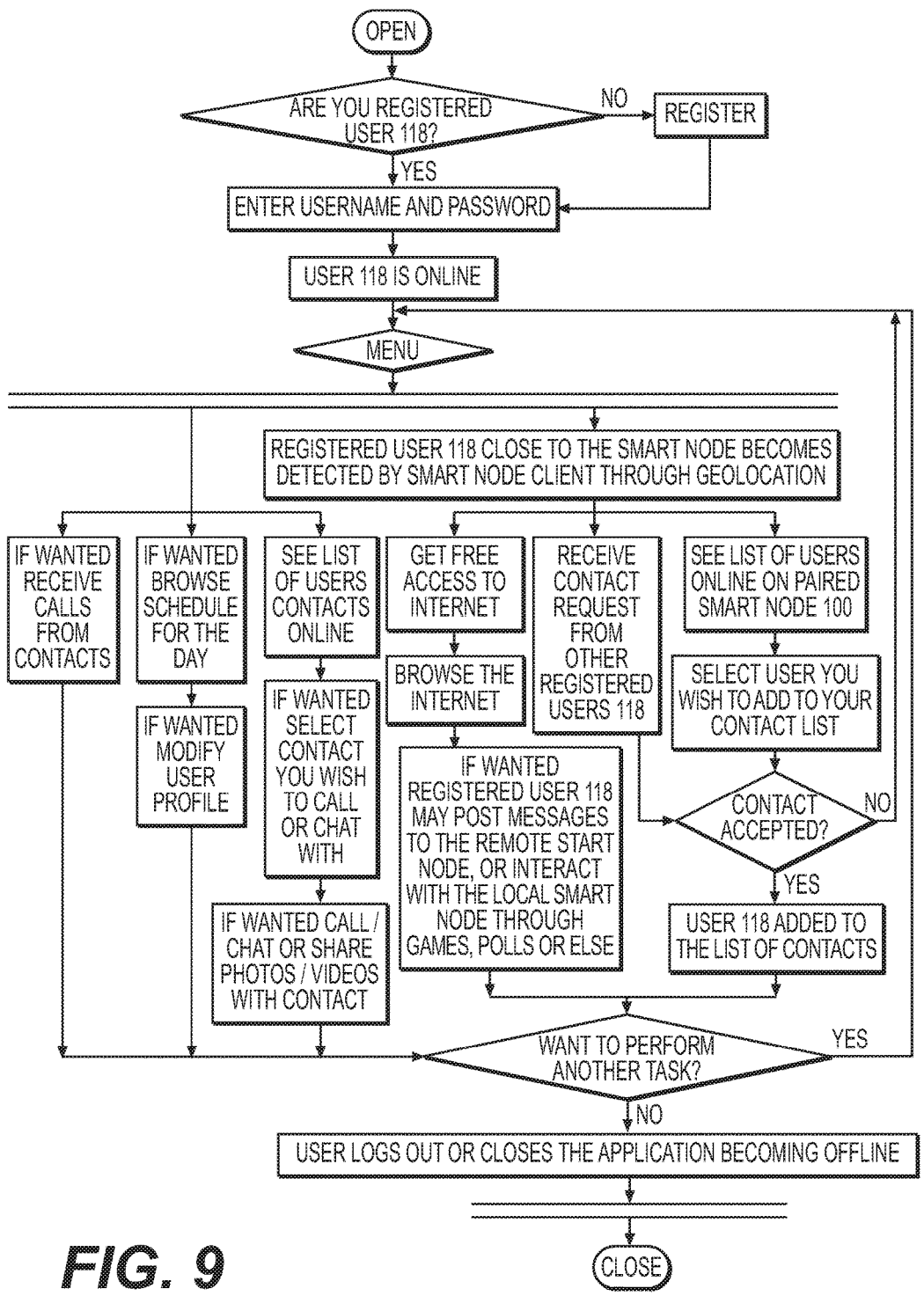
FIG. 9 is a flow-chart showing a process carried out by an exemplary mobile application software in association with the computer process subsystem, by which registered-users may log-in to the intelligent networked system as well as to the Wi-Fi access point of the smart node embodiment, in accordance with the principles of the invention.

FIG. 9 is a flowchart illustrating a configuration in accordance with an embodiment of the mobile application software in association with the software process subsystem of the intelligent system network 121 of smart nodes 100, which enables any non-registered user 117 to become a registered user 118 in order to further engage in a more personalized and interactive experience within the communication platform deployed by the intelligent system network 121 of networking smart nodes 100. As shown in FIGS. 1B and 5, by downloading the system's application software to any personal mobile device 116 (e.g., mobile/portable/wearable, etc.), the now registered user 118 may be able to openly interact with fellow registered users 118 around the intelligent global system network 121. The non-registered user 117 may download the application via the Wi-Fi access point embodied by the smart node 100. The browser may direct the non-registered user 117 to the download location. In case the non-registered user 117 already has a personal mobile Internet connection, the non-registered user 117 may enter the operating system's download page to initiate a direct download. Following this, the non-registered user 117 may be asked to register with the system 121 by creating a username and password, to enable a personal account which may, for example, be used to access the system no matter which device is being used or will be or with which subsystems of smart nodes 100 the registered user 118 interacts with.

After this step, the non-registered user 117 may become a registered user 118 of the intelligent networked system 121, which can enable two main tasks and services: the first being to gain access to the Internet 115 in order to browse the World Wide Web or for any other personal communication use on any personal mobile device 116, and secondly, to be able to connect to the mobile application software of the network system 121. The application software can work together with the geo-location technology of the registered user's 118 personal mobile device 116 (either mobile, portable or otherwise), to establish the registered user's 118 geo-location and said location is periodically refreshed. Thus, once a registered user 118 is online and at a close range (< than predefined distance) of the smart node 100, the user may discover new/fellow registered users 118 that are at a close distance range (< than a predefined distance) to the remote paired smart node 100, thereby enabling the registered user 118 to add fellow registered users 118 into his/her contact list. These are the fellow-registered users 118 that are placed over the remote paired-smart node 100, with whom he/she might be interested in interacting. When registered user 118 accesses the list of fellow users 118 at the remote smart node 100 location, he/she could add them as a new contact in order to have them in a personal contact list, for example. If fellow registered users 118 accept such a contact request, then they can become part of their contact list and would be allowed to have a conversation via a Wi-Fi call, or to otherwise exchange digital data and content, such as messages, photos or videos, for instance. In all cases, registered users 118 may be required to comply as such and enable the application to make appear 'available' for contact. On the other hand, if the contact request is denied, then, the registered users 118 may not be allowed to communicate in any other way through their personal mobile device 116 (e.g., mobile phone) with their fellow counterpart. The mobile application software can engage people worldwide in interacting between them and within the network of smart nodes 100 configuring a social network within the globally registered users 118 of the intelligent networked system 121. Such an interactive communication platform can allow for people to share intercultural experiences that will manifest our global presence and social empathy.

In an embodiment of the application, the technology can be compatible with present technologies that enable a real-time language-translator that would allow registered users 118 speaking different languages to be able to write or even talk in their own native language while, on the other end of the conversation, the same message will appear already translated to the corresponding foreign language. If desired, registered users 118 may post live messages to a remote smart node 100, or interact with a local smart node 100, through games, pols or else, either projected within the live information and marketing taskbar area 119 or the display area 120.

Once a registered user 118 leaves the vicinity of the smart node 100, the mobile application software associated to the computer process subsystem of the intelligent system 121 may be activated from anywhere else and the registered user 118 may be able to continue communicating with his fellow contacts and/or access all of the features of the mobile application. The registered user 118 may also have the possibility of visualizing the schedule of the different smart nodes 100. For example, if the registered user 118 is interested in seeing a specific city, landscape or site, or wishes to meet someone new or an acquaintance from a specific location, the registered user 118 would be able to check the schedule and the time-frame in which the local smart node 100 is connecting to the corresponding remote one. The registered user 118 can modify its user profile from his/her personal account at any time, by changing profile picture, information or contact status between online, offline or busy, for instance. If he/she has finished using the mobile application, the user may then just log-out, which would close the application.

Figure 10:
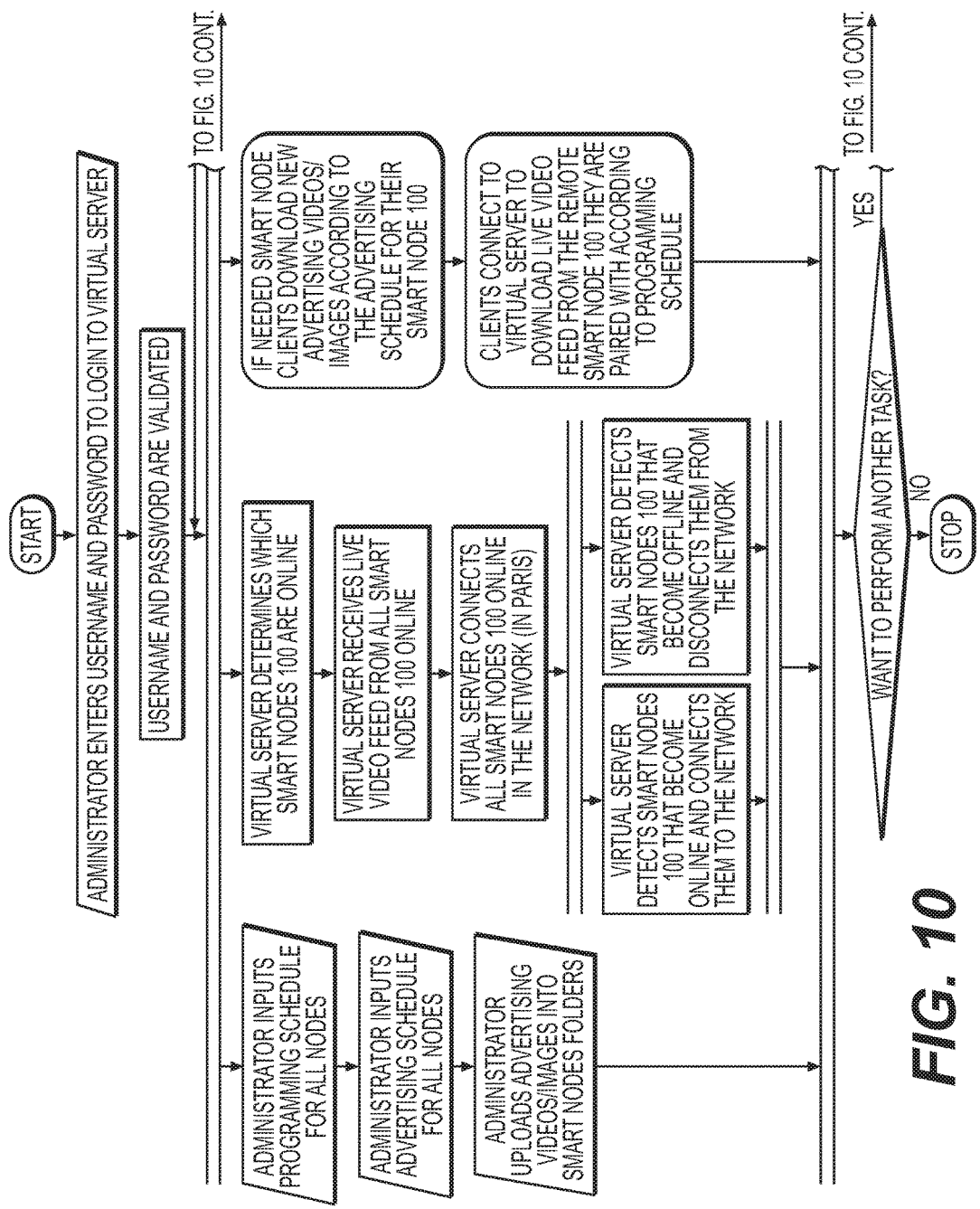
FIG. 10 is a flowchart configuration of an exemplary embodiment of the computer process subsystem describing the connection all smart nodes within the intelligent networked system, along with other functions, all in accordance with the principles of the invention.
Figure 10:
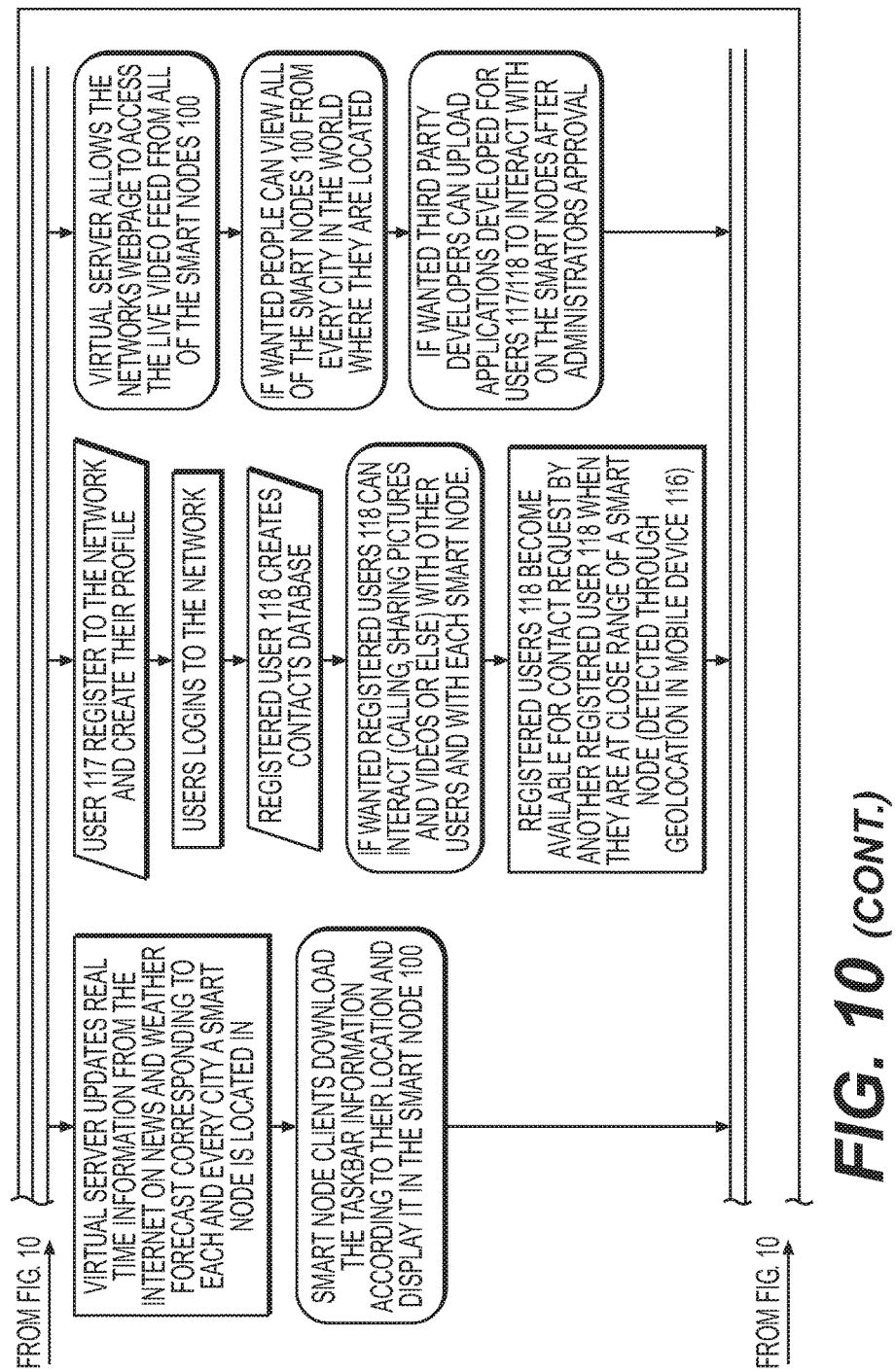

FIG. 10 illustrates a possible configuration in accordance with an embodiment of the computer process subsystem allocated on a virtual server. The computer process subsystem has functions within the intelligent network system 121, such as:

A) To enable all smart nodes 100 to become interconnected and perform as subsystems to the intelligent networked system 121;

B) To administrate and manage the public information and marketing advertisement platform, which is offered and will be broadcasted in each smart node 100 and/or within the global networked system 121;

C) To enable registered users 118 to interact with the intelligent system 121 and its social network in private-mode via engaging a mobile application software, as described in FIG. 9, to enable the logging-in to the system by creating a user profile, enabling the interconnection of mobile devices embodiments of personal use; and D) To enable the system's webpage to showcase live video feeds of the global network of smart node 100 in real-time, while enabling registered user 118 to interact with data and information uploaded to the site.

Regarding A), the computer process subsystem can be configured to administrate, manage, synchronize the pairing and performance of the network of smart nodes 100, which are physically geo-located in multiple destinations, e.g., in different cities, boroughs, countries or otherwise, to allow non-registered users 117 and registered users 118 who interact with a particular smart node 100 to interact with a fellow remote non-registered users 117 or registered users 118, as shown in FIG. 1A, 1B and FIG. 5. The virtual server may be located in the cloud (Internet) and may be accessible by every smart node 100 in the network. Every smart node client (within a given smart node 100) has a unique IP Address that identifies it amongst others inside the network 121. The virtual server is managed by an administrator who, after proper validation (e.g., receiving a value username and password), logs-in the software platform and creates a programming schedule which defines, for instance, the choice and order in which smart nodes 100 will pair on an hourly, daily and/or monthly basis, on a criterion based, for instance, on at least a plurality of attributes, such as Global Positioning System location and time-zoning, seasonality, special events, demand, marketing and advertising world and local campaigns, amongst others. As an example, a smart node 100 which is located within specific Global Positioning System (GPS) coordinates in the city of Paris may be programmed to 'pair' (connect) every day from 2:30 pm to 2:50 pm local time, with a remote smart node 100 located within specific GPS coordinates in the city of New York, where local time is 8:30 am. After the pairing window Paris-New York communication session expires, the Parisian smart node 100 is automatically synchronized to a new pair remote session to run between 2:50 pm to 3:10 pm local time, engaging a new communication channel with a remote smart node 100, this time located within a completely different cultural environment, the city of Dubai, for instance. The programming schedule defines, not only the schedules and how long the pairing sessions last, but also when a certain smart node 100 becomes 'online' or 'offline', based on priority indicators, according not only to the daily exchange but with regards to the potential communication channels to be active on a daily basis between the global network of smart nodes 100 of the intelligent networked system 121. Depending on its geo-location and context, a smart node 100 may be online on a 24-hour loop, as it may be located, for instance, within a transportation hub, with a high-density flow of people throughout the whole day. In other special cases, for instance when allocated within an indoor market, the smart node 100 might go offline within a specific time-frame given opening-closing hours. Thus, the computer process subsystem is prepared to manage the downloading and uploading of real-time media and data between each smart node client and the intelligent networked system 121, for instance processing and composing the video-feed captured by each set of digital video-capture devices 113 embedded within the digital panels 103 of a smart node 100 to be transmitted and broadcasted at the display area 120 of the digital display panels 113 from the remote paired smart node 100 as well as administrate the programming schedule for all and each smart nodes 100, enabling the multiple and simultaneous live-video broadcasting sessions within the plurality of exclusive communication channels enabled between each paired local and remote smart nodes 100 within the global network 121.

Figure 11:
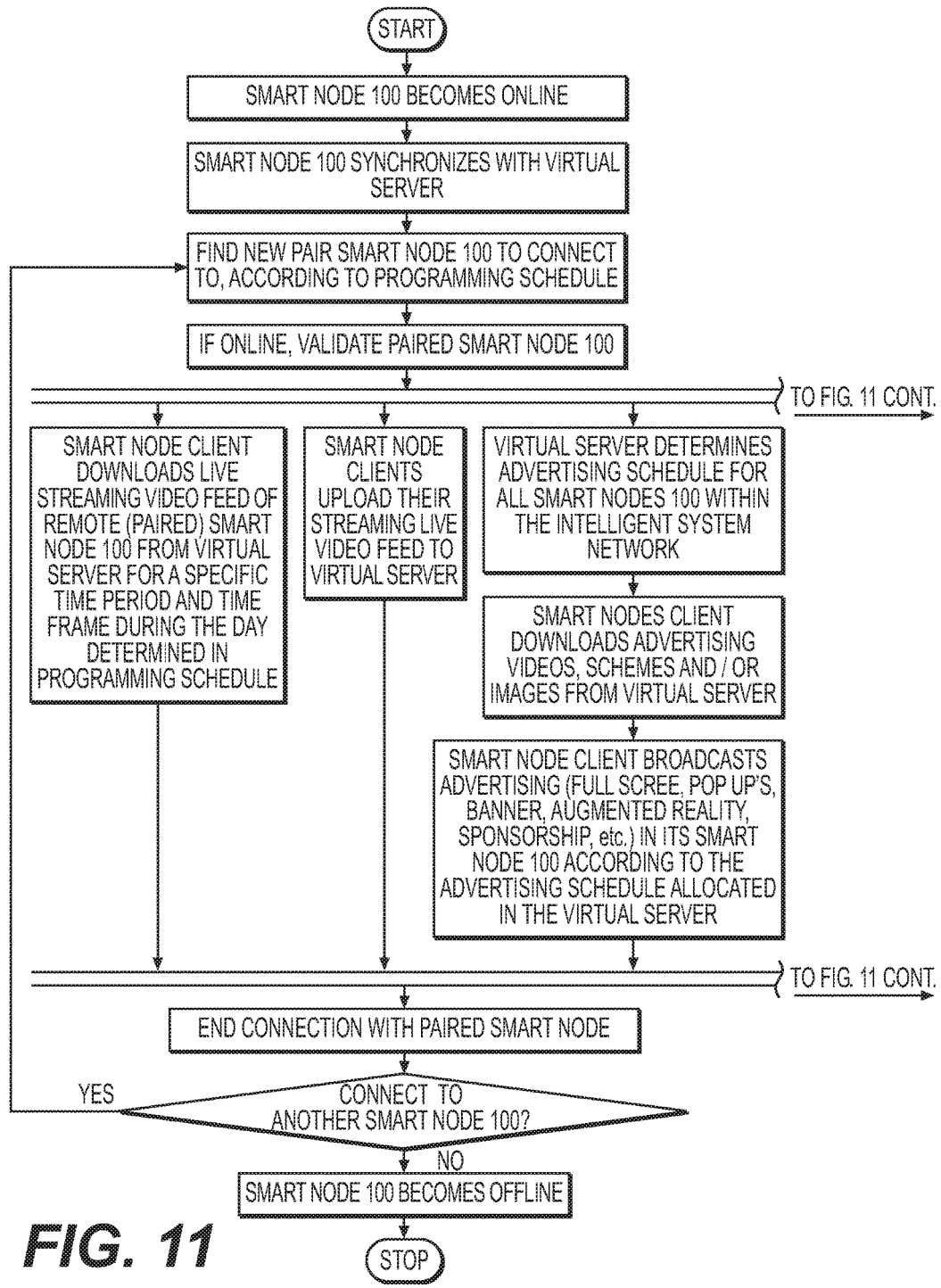
FIG. 11 is a flowchart illustrating an exemplary embodiment of a process carried out by a computer process subsystem installed in a personal computer located inside a smart node embodiment (hereinafter referred to as a "smart node client"), all in accordance with the principles of the invention.
Figure 11:
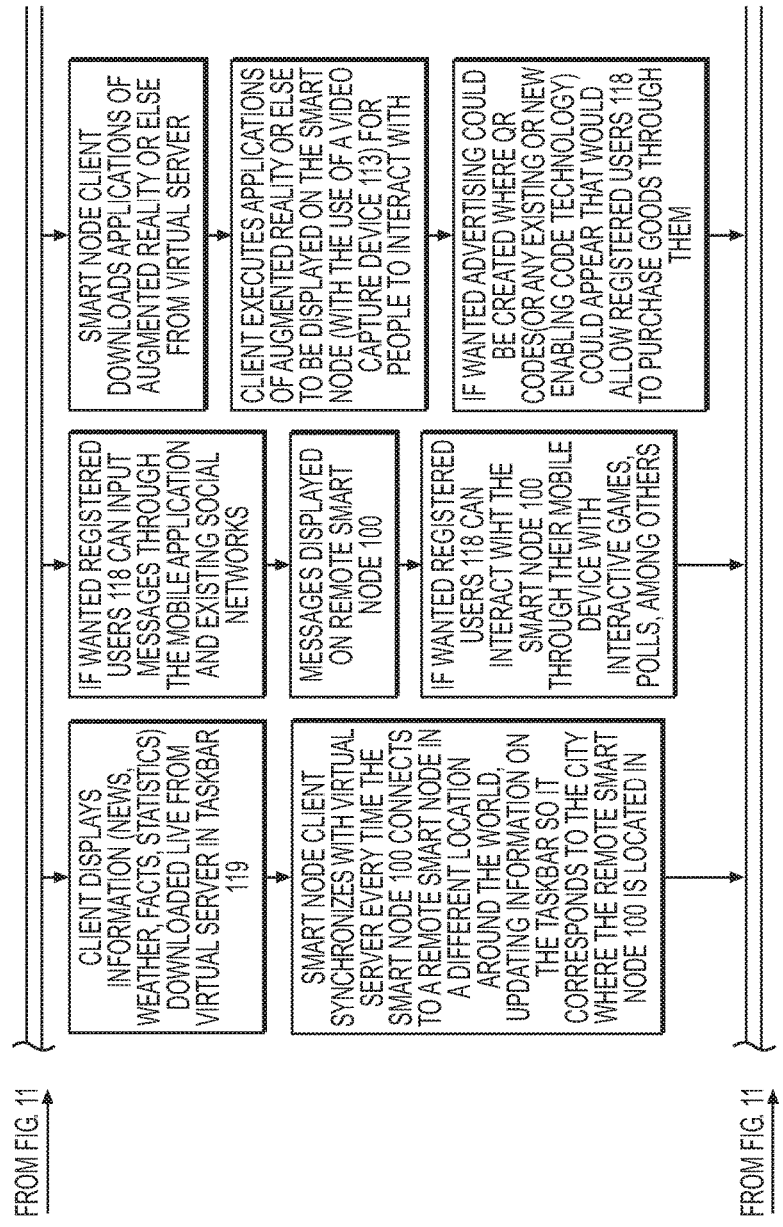

Regarding B), the smart node client (within a given smart node 100) can display advertisings schemes according to an advertising schedule inputted by the administrator in the virtual server for each specific smart node 100 of the intelligent networked system 121. The videos and images of each advertising scheme may be stored inside the smart node client after being downloaded from the virtual server, as seen in FIG. 11. The system's administrator manages the global advertising platform and schedules. A correspondent Administrator to the virtual server may upload all of the advertisings files, in their corresponding formats and schemes and henceforward, every smart node client may proceed to download files to their corresponding advertising scheme according to their particular geo-location in order to be broadcasted locally. The system is scheduled to synchronize when being online in order to identify whether any new file or digital data is available for downloading, or if any changes within existing files allocated within the system need attention The computer process subsystem embodiment of the intelligent network system 121 may enable multiple levels of user engagement campaigns and services, which sets different sorts of advertising and informational schemes to broadcast within the subsystem of smart nodes 100. From full screen advertisings where the smart nodes 100 operate as intelligent billboards, to targeted pop-up advertising schemes, to a looping banner embodiment within the taskbar 119 division, to a specific sponsorship for location or city of a corresponding subsystem of a smart node 100 being static (images) or dynamic (videos), each of these advertisings may be scheduled for every hour of the day for each smart node 100. The software architecture can be a highly dynamic advertising platform in order to be capable of managing and synchronizing independent clusters of data running within an interactive and real-time schedule. As an example, a certain brand of cereal, for instance, may wish to broadcast its advertisement at a particular time frame during the morning schedule in order to target a specific audience within a certain atmosphere. Thus, the software can offer a tailored scheme, as it may offer broadcasting on a specific smart node 100, for instance, located in a targeted transportation hub, between a specific time frame (e.g., between 7:30 AM to 7:40 AM). In this case, the administrator allocates the specific advertising digital data to be broadcasted and inputs the corresponding time frame in the advertising schedule embodiment, which may automatically synchronize within the system.

For instance, there is presently no digital public device (enrooted in the physical world and of public use) that may perform as a digital portal to run a global advertising campaign in real-time, as there are neither an intelligent street furniture embodiment of public scale, offering real-time public information, from live local and international news and sports, weather forecasts, social networks interactivity and/or traffic information and emergency services for public use. Thus, the present invention enables the subsystem of interconnected smart nodes 100 to act as intelligent public billboards, where a same message may be set to simultaneously deploy worldwide, in real-time. Further, a new concept of user engagement campaigns involving augmented reality and kinetic digital video-cameras performing in a multidimensional way becomes possible, in accordance with the principles of this invention. In contrast to a traditional 'unidirectional' billboard display unit of Out-Of-Home advertisement, where there is one interlocutor receiving the conveyed advertisement message (the message goes from the billboard to the viewer/audience), the concept of the present invention embodies a 'multi-directional' advertising platform, whereby a set of paired smart nodes 100 are able to interact in a multidimensional way, as the audience is (both physically and digitally) engaged at each smart node 100 subsystem and across a paired-smart node 100 system. The invention embodies a subsystem of smart nodes 100 which are paired to enable a communication channel, wherein its audiences are located at each smart node 100 subsystem, configuring a dual-channel, in which messages may be conveyed from each smart node 100 to its corresponding audience, or messages can be simultaneously conveyed across smart nodes 100 to their counterpart audiences, while in all cases, the audience gets to be part of the advertisement experience.

Every determined period of time the virtual server can perform an update on the status of every smart node client within the intelligent networked system 121, to see whether they are online or offline. Due to the premise that smart nodes 100 work in pairs, every time smart nodes 100 either go online or offline, they perform that task in pairs so the virtual server always has an even number of smart nodes 100 to connect.

The virtual server receives all live video feed captured by the corresponding set of video-capture devices 113 from all and each smart nodes 100 within the intelligent networked system 121, as soon as each smart node client uploads it to the virtual server. Every smart nodes client then downloads the live video feed that corresponds to the smart nodes 100 that, according to the programming schedule, it should connect to, thereby creating the live connection between the two smart nodes 100, opening the exclusive communication channel.

As a possible embodiment of the software broadcasting configuration, as mentioned in FIG. 5, possible functional and operational divisions may be visualized on the general digital display panels 103, for instance, an upper section 119 which performs as a live-information and marketing task bar for public service, which may display, amongst other data, information such as breaking news, weather and weather forecast, sport news, etc. for each location of each smart node 100 as well as crossing data to inform, of desired reference data from the remote paired smart node 100. This information is in real-time, thus needs to be updated sequentially, according to world events, and the virtual server would download the information needed from the Internet 115 every predefined period of time.

The virtual server can work as an open software platform, not only by allowing registered users 118 to interact within the system 121, but by allowing third party developers to create applications that could be displayed in the smart nodes 100 in order to entertain, inform, or enhance the experience of non-registered and registered users 117, 118 that are standing in front of the smart node 100.

Regarding C), upon approaching a smart node 100 non-registered and registered users 117, 118 can interact with the intelligent networked system 121 as a smart street furniture. If non-registered users 117 would want to become registered users 118, the software platform enables the download of a mobile application software, as described in FIG. 9, and through it, the registration to the intelligent networked system 121. All information a registered user 118 inputs when creating a profile inside the network, e.g. name, surname, gender, nationality, amongst others, can be stored in a database in the cloud inside the virtual server, as well as the list of contacts the registered user 118 will have in the future.

Regarding D), in an embodiment of the software platform a webpage may interact within the intelligent system network in a different way. As an example, upon logging-in, any registered user 118 who is not in front of a smart node 100 or who does not have a personal digital device 116 and wishes to see and interact with all live feedbacks and experiences broadcasted by each and every smart node 100 around the globe, or even wishes to share any anecdote or experience lived within the intelligent networked system 121, may be channelized via a common digital support as the proposed webpage embodiment.

FIG. 11 illustrates a configuration in accordance with an embodiment of the software smart node client.

As mentioned in FIG. 10, when a smart node 100 comes online it becomes available for pairing with other remote smart nodes 100. This process requires validation from the virtual server, thus the software architecture allows the intelligent networked system 121 to synchronize with the virtual server in order to perform the corresponding updates, such as for instance, seeing whether there are new advertising schemes that the specific smart node 100 needs to download to be ready for the next communication session, or the programming schedule to perform and display real-time information within the live public information service and marketing task-bar (upper section) 119, amongst other possible updates. After updating processes are done, the computer process subsystem enables the smart node client to recognize its pairing remote smart node client, according to instructions from the programming schedule at the virtual server, while verifying that it is online. If so, it validates the connection and both smart nodes 100 start their connection via the virtual server.

In order to perform this task, as mentioned in FIG. 10, once the smart node client receives the live video-feed from the set of video-capture devices 113 of the remote smart node 100, the software features a sub-process and composes all the numerous video-feeds, corresponding to the multiple video-capture devices 113 of the remote smart node 100, into one single live video feed which is broadcasted live at the smart node 100. This sub-process within the system's software configuration allows all the live video-feeds from the set of video-capture devices 113 to be transferred simultaneously, avoiding any possible delay between the various video-captured feeds, from each individual video-capturing component of the set 113.

The smart node 100 allows registered users 118 to further interact with it through the use of mobile devices 116. Through the networks mobile application software they can perform several tasks that will appear in the smart node's 100 digital display 103, such as posting messages, answer to questions in trivia's, vote in polls, among others. Registered users 118 can even interact further, as the software design of the intelligent networked system 121 enables the interaction with existing social media networks. Thus, registered users 118 may post messages through compatible social media networks, and those would be displayed in the smart node 100.

In a public display embodiment, the smart node 100 can allow non-registered and registered users 117, 118 to interact in many different ways. As mentioned in FIG. 10, applications can be developed in various ways by third party developers or even by brands, for instance, through advertising schemes in order to entertain non-registered and registered users 117, 118, creating further engagement and awareness to their brand and/or marketing strategies, for instance. As an example, these applications may incorporate augmented reality technology through the video-capture devices 113 and digital display panels 103 of the smart nodes 100, wherein non-registered and registered users 117, 118 may locally interact using the digital display 103 as a 'mirror' simulation with the augmented reality features overlapping images and videos to the display or even with non-registered and registered users 117, 118 remotely. In particular, their counterparts from one side can see images and videos overlapped in the live video feed of the other geo-location or city. The use of video-capture devices 113 with kinetic features, for instance, can be used also to create an enhanced experience where both non-registered and registered users 117, 118 standing in front of the smart node 100 would be recognized by the video-capture devices 113, as well as their physical/body movements, allowing the engagement of the audience in dynamic activity (i.e., application, game, etc.) that wishes to be developed.

The public services and features involved in the intelligent networked system 121 may promote non-registered users 117 to become registered users 118 to engage further with the system with regards to features of entertainment it provides, as well as for the service of providing free Wi-Fi Internet as an access point and the fact of being a public network. The system may also create an environment of confidence and engagement that would even allow sponsors or brands which advertise in it, to create promotions including digital mobile transaction code technologies (as an example, QR codes, amongst others) that registered users 118 could read with their mobile device 116 by capturing images, and as they are logged-in to the system 121, they may access, for instance, any store promotions in real-time, or special discounts on certain goods and/or services or even buy products through the system, to enumerate a few of the many possible options.

In the foregoing specification, the invention has been described with reference to specific embodiments thereof. It will, however, be evident that various modifications and changes may be made thereto without departing from the broader spirit and cope of the invention. The specification and drawings are, accordingly, to be regarded in an illustrative rather than restrictive sense.

What is claimed is:

1. An intelligent networked system comprising:
   a plurality of smart nodes, each configured to pair directly with other remote smart nodes over the internet;
   a computer process subsystem on a server and connected over the internet to smart node clients located at each of said plurality of smart nodes, wherein the computer process subsystem is configured to enable temporary pairing of a first node of said plurality of smart nodes to a second node of said plurality of smart nodes which is remote from said first node and, after a time set forth in a schedule, to automatically enable temporary pairing of said first node with a third node of said plurality of smart nodes which is remote from said first and second nodes;
   video display arrays, located at each of said first node, second node and third node, configured to display live video communication feeds at approximately full-human body dimensional scale;
   at least one set of video-capture devices, located at the second node and embedded within the video display array located at the second node, configured to capture a live video communication feed that is transmitted to the first node when the second node is temporarily paired to the first node such that the live video communication feed captured by the at least one set of video-capture devices at the second node is displayed on the video display array of the first node at approximately full-human body dimensional scale; and
   at least one set of video-capture devices, located at the third node and embedded within the video display array located at the third node, configured to capture a live video communication feed that is transmitted to the first node when the third node is temporarily paired to the first node such that the live video communication feed captured by the at least one set of video-capture devices at the third node is displayed on the video display array of the first node at approximately full-human body dimensional scale.

2. An intelligent networked system according to claim 1, further comprising:
   at least one set of video-capture devices, located at the first node and embedded within the video display array located at the first node, configured to capture a live video communication feed that is transmitted to the second node when the first node is temporarily paired to the second node such that the live video communication feed captured by the at least one set of video-capture devices at the first node is displayed on the video display array of the second node at approximately full-human body dimensional scale.

3. An intelligent networked system according to claim 2, wherein the first node is further configured to transmit the live video communication feed to the third node when the first node is temporarily paired to the third node such that the live video communication feed captured by the at least one set of video-capture devices at the first node is displayed on the video display array of the third node at approximately full-human body dimensional scale.

4. An intelligent networked system according to claim 1, wherein said first smart node further comprises an internet access point configured to provide a wireless internet connection for a plurality of external electronic devices.

5. An intelligent networked system according to claim 4, wherein said computer process subsystem is configured to enable a registered user located within a predefined proximity to a temporarily paired smart node to communicate over said wireless internet connection with another registered user located within a predefined proximity to a temporarily paired smart node through electronic devices possessed by each user.

6. An intelligent networked system according to claim 1, wherein each of said video display arrays is configured to display, on a section of each such array of video displays, advertisements to local registered and non-registered users based on characteristics of such users.

7. An intelligent networked system according to claim 1, wherein said computer process subsystem on said server is further configured to enable registered users to log-in to said intelligent networked system in order to obtain an enhanced level of communication with other registered users, the enhanced level of communication being enhanced as compared to a level of communication when not logged in to the intelligent networked system.

8. An intelligent networked system according to claim 1, wherein each of said first node, second node and third node are physically located in public locations.

9. An intelligent networked system according to claim 1 wherein each of said video display arrays comprises multiple high definition display panels, and said video display arrays are configured to display live video communication feeds in high definition, with each of said video display panels being configured to display a portion of the displayed live video communication feeds.

10. An intelligent networked system according to claim 1, wherein communications between pairs of smart nodes of the plurality of smart nodes are set up with exclusively paired communication channels that communicate simultaneously, and when the communications between the pairs of smart nodes are terminated the intelligent networked system automatically sets up different exclusively paired communication channels that communicate simultaneously between different pairs of smart nodes.

11. A smart node assembly, comprising:
   a video display array configured to display, at approximately full-human body dimensional scale, a live video feed provided by video capture devices located at a paired remote smart node, said video display array configured to display a main active window area configured to display said live-video feed and a smart information area configured to display a plurality of individual active windows for broadcasting real-time information;
   a set of video-capture devices configured to capture a live video communication feed that is transmitted to said paired remote smart node, said set of video capture devices embedded within said video display array;
   a CPU, coupled to said video display array and said set of video capture devices, configured to execute a smart node client to enable said live video communication feed;
   a modem configured to connect said CPU to the internet; and a supporting structure that physically supports said video display array, said set of video capture devices, said CPU, and said modem.

12. A smart node assembly according to claim 11, wherein said real-time information in said smart information area comprises at least one of advertisements, news information, sports information, and social networks information.

13. A smart node assembly according to claim 11, wherein said smart information area is configured to display real-time information at the smart node assembly that is being simultaneously displayed at said paired remote smart node, to enable information to be shared in real-time between users located at the smart node assembly and at the paired remote smart node, respectively.

14. A smart node assembly according to claim 11, wherein said smart node client is configured to temporarily pair said smart node assembly with a first remote smart node such that said video display array provides a live video feed to the smart node assembly from the first remote smart node location and, after a time set forth in a schedule, to subsequently pair said smart node assembly with a second remote smart node instead of said first remote smart node such that said video display array provides the live video feed from said second remote smart node location to the smart node assembly.

15. A smart node assembly according to claim 11, wherein said modem is a Wi-Fi modem configured to enable registered users to access the internet on electronic devices.

16. A smart node assembly according to claim 11, wherein communications between pairs of smart nodes of the plurality of smart nodes are set up with exclusively paired communication channels that communicate simultaneously, and when the communications between the pairs of smart nodes are terminated the intelligent networked system automatically sets up different exclusively paired communication channels that communicate simultaneously between different pairs of smart nodes.

17. An intelligent networked system comprising:
a computer process subsystem on a server, wherein the computer process subsystem is configured to enable pairing of a first smart node to a second smart node which is remote from said first smart node through smart node clients located at each of said first smart node and said second smart node;
video display arrays, located at each of said first smart node and second smart node, configured to display live video communication feeds at approximately full-human body dimensional scale;
at least one set of video-capture devices, located at the second smart node and embedded within the video display array located at the second smart node, configured to capture a live video communication feed that is transmitted to the first smart node when the second smart node is paired to the first smart node such that the live video communication feed captured by the at least one set of video-capture devices at the second smart node is displayed on the video display array of the first smart node at approximately full-human body dimensional scale; and
at least one set of video-capture devices, located at the first smart node and embedded within the video display array located at the first smart node, configured to capture a live video communication feed that is transmitted to the second smart node when the first smart node is temporarily paired to the second smart node such that live video communication feed captured by the at least one set of video-capture devices at the first smart node is displayed on the video display array of the second smart node at approximately full-human body dimensional scale.

18. An intelligent networked system of claim 17, wherein said computer process subsystem is further configured to enable registered users to communicate to other registered users through electronic devices, wherein said electronic device comprises at least one of a laptop, smartphone, tablet, or smartwatch.

19. An intelligent networked system of claim 17, wherein said computer process subsystem is further configured to initiating communication between each of said first and second smart nodes with said server when said smart nodes become online; and
synchronizing said first and second smart nodes upon becoming online with said server to perform operational updates, wherein said operational updates may include updating an advertising scheme and real-time public service information to be displayed on a smart information area configured to display a plurality of individual active windows for broadcasting real-time information on said video display arrays.

20. An intelligent networked system of claim 17, wherein said video display arrays, are configured to display advertisements on a smart information area of said video display array.

21. An intelligent networked system of claim 17, wherein said computer process subsystem is further configured to:
receive registration information from a user entered into a mobile application on an electronic device;
download information from said server to said electronic device; and
provide for the engagement in a peer-to-peer communication session among a plurality of registered users located at a predefined radial distance from any of said temporarily paired smart nodes.

22. An intelligent networked system of claim 21, wherein said computer process subsystem is further configured to:
enabling said registered users to discover remote registered users within a preset radius distance range from said temporary paired remote smart node;
enable electronically sending communication from registered users to other registered users, wherein said communication may comprise at least one of the following formats: Short-Message (SMS), Enhances SMS (EMS), Multi-Media Message (MMS), email, Wi-Fi calls, video-calls, or chat; and
permit said registered users the option to select whether to accept or refuse communication from other registered users.

23. An intelligent networked system of claim 17, wherein communications between pairs of smart nodes of the plurality of smart nodes are set up with exclusively paired communication channels that communicate simultaneously, and when the communications between the pairs of smart nodes are terminated the intelligent networked system automatically sets up different exclusively paired communication channels that communicate simultaneously between different pairs of smart nodes.

* * * * *

UNITED STATES PATENT AND TRADEMARK OFFICE
CERTIFICATE OF CORRECTION

| | | |
|---|---|---|
| PATENT NO. | : 10,382,720 B2 | Page 1 of 1 |
| APPLICATION NO. | : 15/745671 | |
| DATED | : August 13, 2019 | |
| INVENTOR(S) | : Alejo Serrano et al. | |

It is certified that error appears in the above-identified patent and that said Letters Patent is hereby corrected as shown below:

In the Drawings

Sheet 10, Fig. 9, change "START" to --SMART-- in the box labeled "IF WANTED REGISTERED USER 118 MAY POST MESSAGES TO THE REMOTE START NODE, OR INTERACT WITH THE LOCAL SMART NODE THROUGH GAMES, POLLS OR ELSE".

Sheet 11, Fig. 10, change "PARIS" to --PAIRS-- in the box labeled "VIRTUAL SERVER CONNECTS ALL SMART NODES 100 ONLINE IN THE NETWORK (IN PARIS)".

Sheet 13, Fig. 11, change "NODES" to --NODE-- in the box labeled "SMART NODES CLIENT DOWNLOADS ADVERTISING VIDEOS, SCHEMES AND/OR IMAGES FROM VIRTUAL SERVER".

Sheet 13, Fig. 11, change "SCREE" to --SCREEN-- in the box labeled "SMART NODE CLIENT BROADCASTS ADVERTISING (FULL SCREE, POP UP'S, BANNER, AUGMENTED REALITY, SPONSORSHIP, etc.) IN ITS SMART NODE 100 ACCORDING TO THE ADVERTISING SCHEDULE ALLOCATED IN THE VIRTUAL SERVER".

Signed and Sealed this
First Day of October, 2019

Andrei Iancu
*Director of the United States Patent and Trademark Office*